US010012808B2

(12) United States Patent
Chou et al.

(10) Patent No.: US 10,012,808 B2
(45) Date of Patent: Jul. 3, 2018

(54) OPTICAL FIBER STRIP, ACTIVE OPTICAL MODULE AND ACTIVE OPTICAL CABLE

(71) Applicant: CYNTEC CO., LTD., Hsinchu (TW)

(72) Inventors: Po-Kuei Chou, Hsinchu (TW); Sheng-Hong Yu, Hsinchu (TW); Chieh Huang, Hsinchu (TW)

(73) Assignee: CYNTEC CO., LTD., Hsinchu (TW)

( * ) Notice: Subject to any disclaimer, the term of this patent is extended or adjusted under 35 U.S.C. 154(b) by 0 days.

(21) Appl. No.: 15/367,152

(22) Filed: Dec. 1, 2016

(65) Prior Publication Data
US 2018/0156990 A1    Jun. 7, 2018

(51) Int. Cl.
G02B 6/36 (2006.01)
G02B 6/38 (2006.01)
G02B 6/42 (2006.01)
H04B 10/25 (2013.01)

(52) U.S. Cl.
CPC ............. *G02B 6/423* (2013.01); *G02B 6/425* (2013.01); *G02B 6/4239* (2013.01); *G02B 6/4243* (2013.01); *G02B 6/4256* (2013.01); *G02B 6/4274* (2013.01); *G02B 6/4292* (2013.01); *H04B 10/2504* (2013.01)

(58) Field of Classification Search
CPC .... G02B 6/4239; G02B 6/4243; G02B 6/425; G02B 6/4526
USPC ........................................................ 398/115
See application file for complete search history.

(56) References Cited

U.S. PATENT DOCUMENTS

| 6,402,389 | B1* | 6/2002 | Steijer ............. | G02B 6/3829 385/114 |
| 6,422,760 | B1* | 7/2002 | Matasek ............ | G02B 6/3879 385/53 |
| 6,594,435 | B2* | 7/2003 | Tourne ............. | G02B 6/3887 385/134 |
| 9,720,184 | B2* | 8/2017 | Benner ............. | G02B 6/3829 |
| 9,726,829 | B2* | 8/2017 | Benner ............. | G02B 6/3829 |
| 9,784,930 | B2* | 10/2017 | Sutherland ......... | G02B 6/4214 |
| 2002/0114581 | A1* | 8/2002 | Chen ................ | G02B 6/3869 385/56 |
| 2006/0115217 | A1* | 6/2006 | Childers ........... | G02B 6/3839 385/53 |
| 2009/0297099 | A1* | 12/2009 | Benjamin .......... | G02B 6/25 385/32 |

(Continued)

FOREIGN PATENT DOCUMENTS

| CN | 103323922 A | 9/2013 |
| TW | M403667 U1 | 5/2011 |
| WO | 2009/038572 A1 | 3/2009 |

*Primary Examiner* — Oommen Jacob
(74) *Attorney, Agent, or Firm* — Winston Hsu

(57) ABSTRACT

An optical fiber strip has a stair-shaped base element, a cover element, an adapter and an internal optical fiber array. The stair-shaped base element has a plurality of holes and a first bearing surface. The holes are integrally formed and extends from the first receiving surface to a bottom surface of the stair-shaped base element. The cover element includes an internal curved space between the first curved part and second curved part. The internal optical fiber array is selectively and optically coupled to tan optical-electrical conversion unit via the holes. A curved portion of the internal optical fiber array is located in the internal curved space for changing direction of the internal optical fiber array.

20 Claims, 12 Drawing Sheets

(56) References Cited

U.S. PATENT DOCUMENTS

2013/0194566 A1* 8/2013 Schell ................ G01M 11/3136
356/73.1
2016/0223763 A1* 8/2016 Benner ................ G02B 6/3829
2016/0291261 A1* 10/2016 Izumi ................... G02B 6/3839

* cited by examiner

OPTICAL FIBER STRIP, ACTIVE OPTICAL MODULE AND ACTIVE OPTICAL CABLE

BACKGROUND OF THE INVENTION

1. Field of the Invention

The invention is related to an optical fiber strip, and more specifically, to an optical fiber strip including a stair-shaped base element, a cover element and at least one of the first bearing surface and the second bearing surface having a groove.

2. Description of the Related Art

In the field of telecommunications, optical fibers have been widely used for transmitting and receiving signals because signals may be sent or propagated at higher bandwidth (data rate) and for longer distances via optical fibers than traditional wire cables. When using optical fibers, a reliable coupler of optical fiber strip is necessary for connecting optical fibers to a related optical element such as an optical control chip/chipset assembled on a print circuit board (PCB). The coupler of optical fiber strip is expected to fix and protect optical fibers appropriately because optical fibers are usually fragile. In each optical fiber, signals are transmitted by total internal reflection (TIR) so that optical fibers are usually made of materials with high refractive index. Presently, the predominant material of optical fibers such as glass or silicon dioxide may be quite fragile. Hence, an optical fiber may be broken easily when being bent with an excessive curvature, or when an unwanted displacement of a coupler of optical fiber strip occurs. In the field, a reliable solution is required to prevent optical fibers from being broken when being connected to a related optical element, an adapter or other optical fibers. Furthermore, a bending curvature of a fiber array of an optical fiber strip may vary by temperature and humidity level, so the curvature is difficult to be kept accurately so that the insertion loss of an optical fiber may be larger than 10%. When performing multi-mode operation, the insertion loss may even larger.

SUMMARY OF THE INVENTION

An optical fiber strip is provided according to an embodiment of the present invention. The optical fiber strip includes a stair-shaped base element, a cover element, an adapter and an internal optical fiber array. The stair-shaped base element has a plurality of holes integrally formed and extending from the first receiving surface to a bottom surface of the stair-shaped base element. The cover element has an internal curved space between the first curved part and second curved part extending from the second end to the second bearing surface. The internal optical fiber array is connected to the plurality of holes passing through the internal curved space to be selectively and optically coupled to an optical-electrical conversion unit on the bottom surface of the stair-shaped base element. A curved portion of the internal optical fiber array is located in the internal curved space for changing direction of the internal optical fiber array. At least one of the first bearing surface and the second bearing surface has a plurality of grooves forming a plurality of pathways connecting the internal curved space to the plurality of holes.

An active optical module is provided according to another embodiment of the preset invention. The active optical module includes a substrate, a housing case, an optical-electrical conversion unit and an optical fiber strip. The substrate includes a plurality of conductive paths, an electrical interface and a plurality of pads. The housing case unit forms a housing space inside, and is used to encase an internal optical fiber array, an optical fiber strip and an optical-electrical conversion unit in the housing space. The optical-electrical conversion unit is mounted on the substrate to convert between electrical signals and respective optical signals. The optical fiber strip is coupled to the housing case unit and the optical-electrical conversion unit.

An active optical cable is provided according to yet another embodiment of the present invention. The active optical cable includes an optical fiber array and a pair of active optical modules optically coupled to each other by the optical fiber array. One of the active optical modules includes a substrate, a housing case unit, an optical-electrical conversion unit, a stair-shaped base element and a cover element. One of ends of the optical fiber array extending from the outside of the housing case unit to the plurality of holes passing through the internal curved space to be optically coupled to the optical-electrical conversion unit on the bottom surface of the stair-shaped base element.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
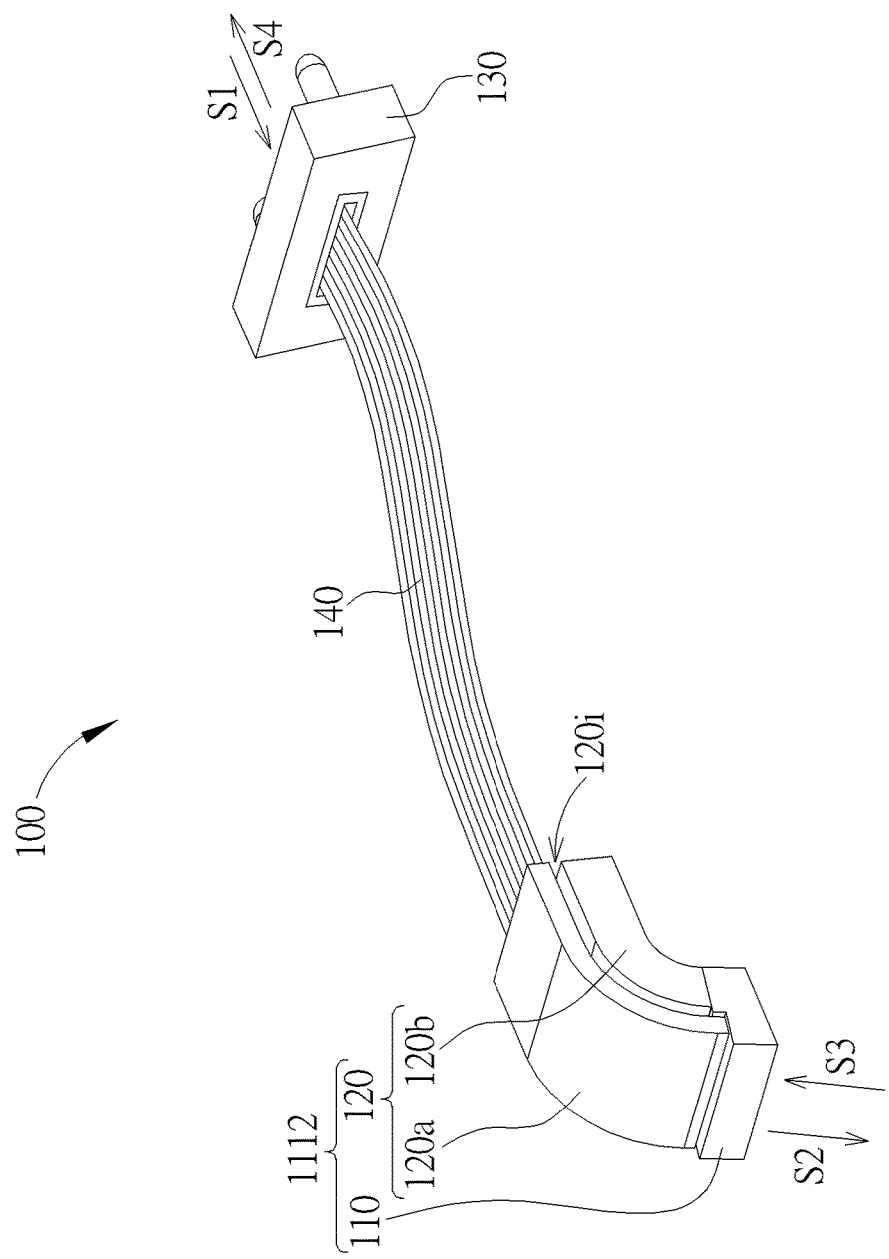
FIG. 1 illustrates an optical fiber strip according to an embodiment of the present invention.
Figure 2:
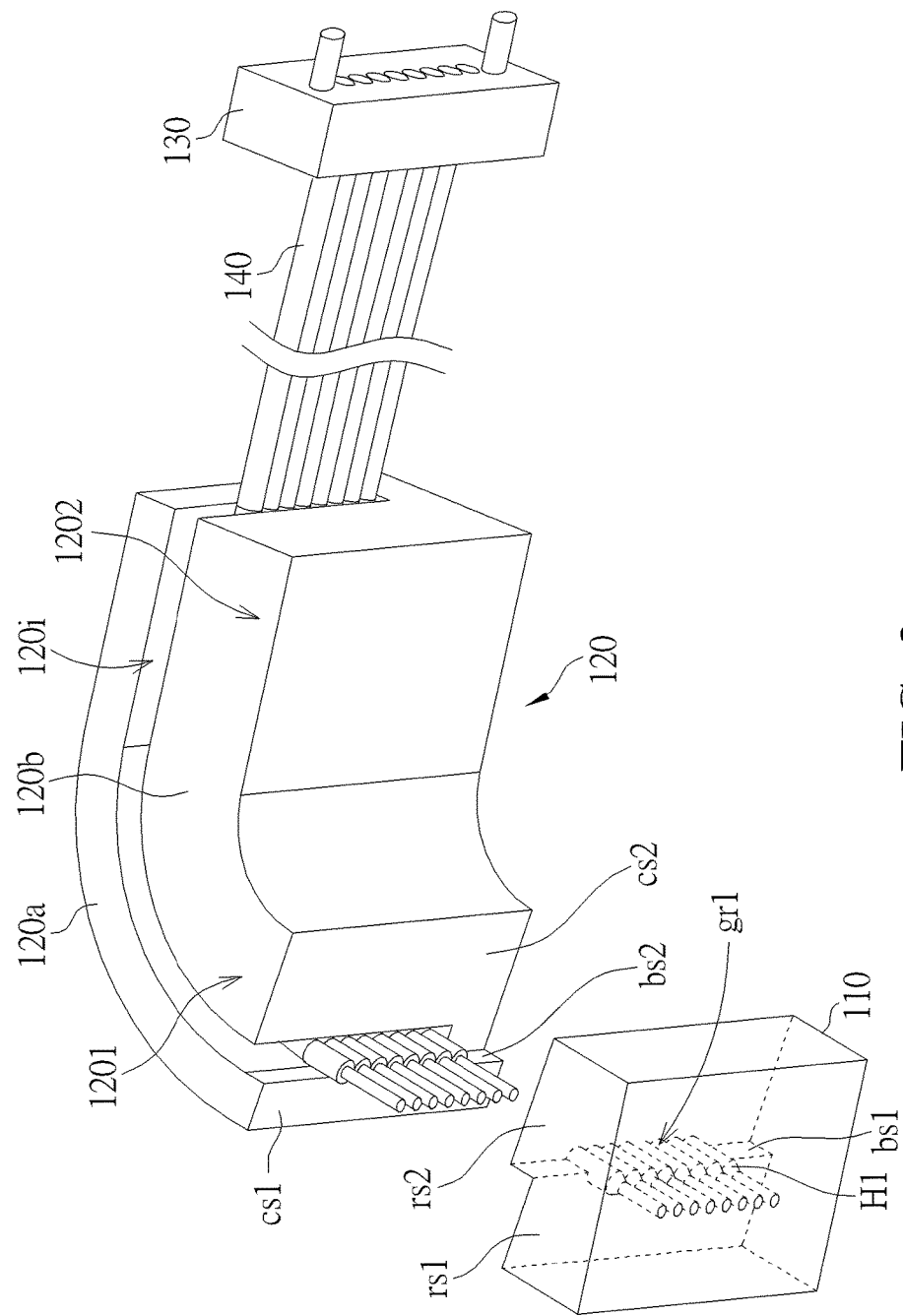
FIG. 2 illustrates structures of the stair-shaped base element and the cover element of FIG. 1.

FIG. 1 illustrates an optical fiber strip 100 according to an embodiment of the present invention. The optical fiber strip 100 may include a stair-shaped base element 110, a cover element 120, an adapter 130 and at least one internal optical fiber 140 forming an internal optical fiber array. FIG. 2 illustrates structures of the stair-shaped base element 110 and the cover element 120 of FIG. 1. The stair-shaped base element 110 has a first receiving surface rs1 on a first stair of the stair-shaped base element 110, a second receiving surface rs2 on a second stair of the stair-shaped base element 110, and a first bearing surface bs1 connecting the first and the second stairs. The stair-shaped base element 110 may form at least one hole H1 selectively parallel to the first bearing surface bs1 and extending through the stair-shaped base element 110. The number of hole H1 and the number of the internal optical fiber 140 may depend on practical application according embodiments of the present invention. For example, two holes for placing two optical fibers or eight holes for placing eight optical fibers may be a commonly used specification in the field. According to embodiments of the present invention, when using eight optical fibers, four of them may be used to transmit signals, and the four other fibers may be used to receive signals. Similarly, when using two optical fibers, one optical fiber may be used to transmit signals, and another fiber may be used to receive signals. Therefore, the optical fibers may form a interconnect data bus. The cover element 120 may include a first end 1201, a second end 1202, a first curved part 120a and a second curved part 120b. The first curved part 120a may have a first covering surface cs1 forming a first stair of the cover element 120 at the first end 1201. The second curved part 120b may have a second covering surface cs2 forming a second stair of the cover element 120 at the first end 1201. A second bearing surface bs2 may connect the first and the second stairs of the cover element 120. The first and second curved parts 120a-120b may form an internal curved space 120i between the first and second curved parts 120a-120b extending from the second end 1202 to the second bearing surface bs2. The internal optical fiber 140 may be placed through the internal curved space 120i from the second end 1202 to the hole H1 as shown in FIG. 1. The adapter 130 may be used to act as an optical interface for being optically coupled to an external optical fiber (not illustrated) so that the internal optical fiber 140 may be coupled to the corresponding external optical fiber. The internal optical fiber 140 is coupled to the adapter 130 and an optical-electrical conversion unit (not illustrated in FIGS. 1-2), and is used to receive a first optical signal S1 from the external optical fiber via the adapter 130, receive a third optical signal S3 from the optical-electrical conversion unit, transmit a second optical signal S2 to the optical-electrical conversion unit according to the first optical signal S1, and transmit a fourth optical signal S4 to the external optical fiber according to the third optical signal S3. The adapter 130 may include an optical fiber ferrule or other types of connector. The adapter 130 may have at least one alignment structure (e.g. the two protruding parts of the adapter 130 shown in FIG. 2) for aligning with and engaging with the external optical fiber array. For example, the external optical fiber array may have two corresponding recessing parts to engage with the adapter 130. The stair-shaped base element 110 and the cover element 120 may be assembled to form a coupler 1112. The stair-shaped base element 110 and the cover element 120 may be assembled by using ultrasonic welding or other welding means. The optical-electrical conversion unit may be a optoelectronic chip that converses optical signals to and from electrical signals, and it will be described in more detail below.

Figure 3:
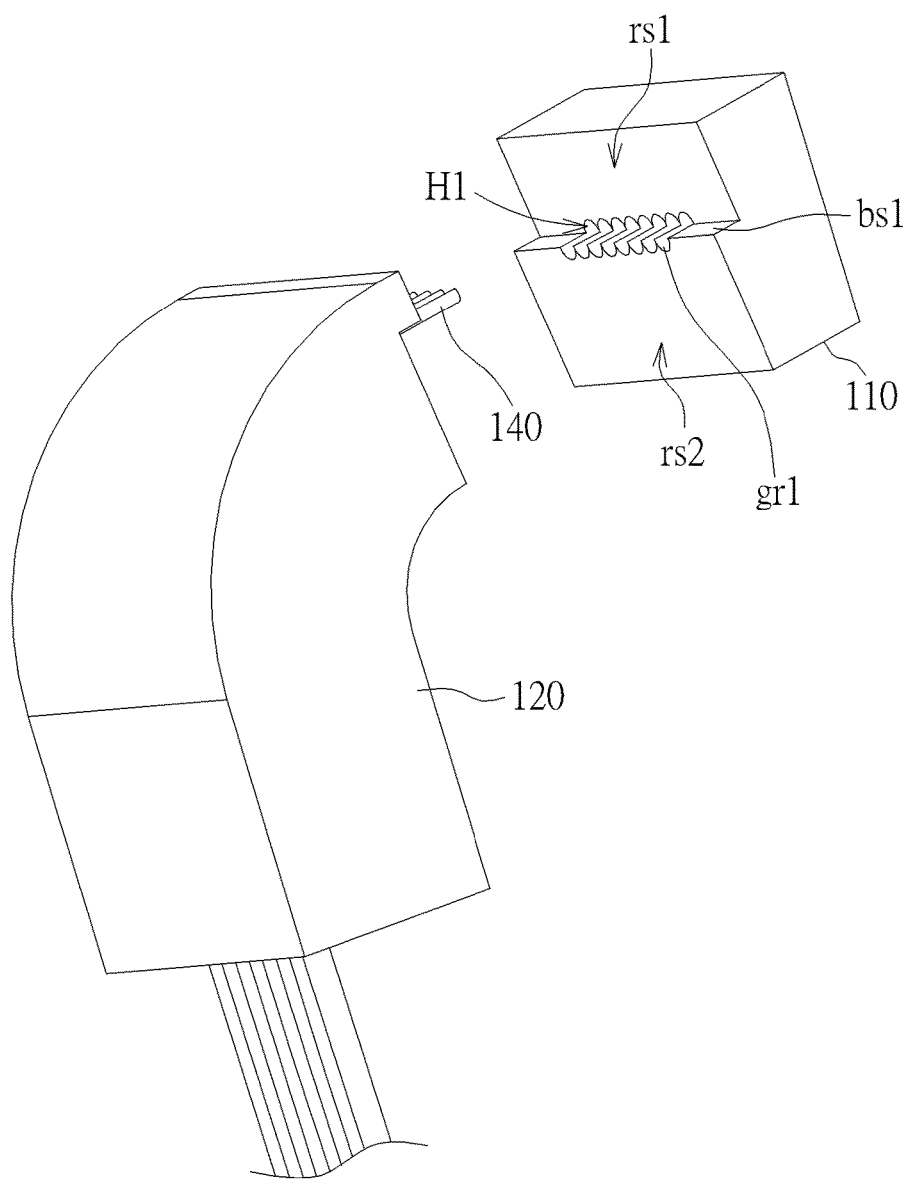
FIG. 3 illustrates the stair-shaped base element and the cover element of FIGS. 1-2 from another perspective.

Referring to FIG. 2, regarding the stairs-shaped base element 110 and the cover element 120, at least one of the first bearing surface bs1 and the second bearing surface bs2 has at least one groove gr1 (shown in FIG. 3). The number of grooves gr1 may correspond to the number of the internal optical fibers 140 and the holes H1. The groove gr1 may form a pathway connecting the internal curved space 120i to the hole H1 when the first receiving surface rs1, the second receiving surface rs2, and the first bearing surface bs1 of the stair-shaped base element 110 respectively join to the first covering surface cs1, the second covering surface cs2, and the second bearing surface bs2 of the cover element 120 so that the stair-shaped base element 110 and the cover element 120 are assembled together (as shown in FIG. 1).

FIG. 3 illustrates the stair-shaped base element 110 and the cover element 120 of FIGS. 1-2 from another perspective. In FIG. 3, the grooves gr1 are formed on the first bearing surface bs1. According to an embodiment of the present invention, glue may be filled into the internal curved space 120i after the internal optical fiber 140 is placed into the internal curved space 120i so as to increase stability of the optical fiber array. The glue such as soft type may act as shock-absorbing adhesive and increase stability of the internal optical fiber 140 extending through the pathway connecting the internal curved space 120i, the grooves gr1, and the holes H1. The holes H1 may be formed integrally. The holes H1 may extend from the first receiving surface rs1 to a bottom surface of the stair-shaped base element 110. Since a distance between two optical fibers may be very short, the distance between two holes H1 and the position of each hole H1 need to be located accurately for each optical fiber to be placed correctly. Otherwise, a large insertion loss may be caused. Laser cutting or drilling may be used to form each hole integrally in advance, the location and pitch (or interspace) of the holes may be set effectively, and the location and pitch of the optical fibers may be set accurately. In this way, the optical port (e.g. Po in FIG. 7) of the optical-electrical conversion unit (e.g. OCU in FIG. 6) may be aligned with the holes H1 of the stair-shaped base element 110 correctly. In short, forming the holes integrally may improve the accuracy of the pitch of the holes. It may avoid affecting the accuracy of the pitch of the holes by the assembly process or the optical fibers.

Since the cover element 120 is of a curved shape, the cover element 120 may have a radius of curvature. With considering the reliability and bendability of an optical fiber, the radius of curvature of the cover element 120 may be greater than 2.3 millimeter or equal to 2.3~5 millimeter to keep the data bandwidth, data transmission rate and transmission distance of the internal optical fiber and protect the internal optical fiber from being broken. As shown in FIGS. 1-2, a length of the first curved part 120a may be greater than a length of the second curved part 120b so as to form two stairs.

According to an embodiment of the preset invention, the stair-shaped base element 110 may and glue G1 be formed by using a transparent or translucent material. For example, glass, acrylic or other suitable transparent or translucent material may be used. The internal curved space 120i may form a lateral opening of the cover element 120 for the curved portion of the internal optical fiber array to be slid into the internal curved space 120i, wherein a curved portion of the internal optical fiber array 140 is located in the internal curved space 120i for changing direction of the internal optical fiber array 140 from horizontal (substrate plane) to vertical. The assembly of the cover element 120 and the stair-shaped base element 110 may be performed more easily by using laser welding, adhesive assembly and ultrasonic welding, etc. Adhesive being not heat curing may be used to assemble the cover element 120 and the stair-shaped base element 110. For example, a light-curing adhesive such as an UV adhesive may be used. This may prevent melting or softening the soldering material (e.g. tin or tin alloy) so as to keep the position of the optical port (e.g. Po in FIG. 7) of the optical-electrical conversion unit OCU without shifting away. The optical port Po and the hole H1 may be thus aligned with one another correctly to prevent the insertion loss of the optical signals. As shown in FIGS. 2 and 3, the plurality of grooves gr1 may be formed on the first bearing surface bs1, and portions of inner surfaces of the plurality of grooves gr1 may be smoothly extended to portions of inner surfaces of the plurality of holes H1. Hence, when placing the internal optical fiber array 140 from the grooves gr1 into the holes H1, the internal optical fiber array 140 may be placed along with the inner surfaces of the grooves gr1 into the holes H1 easily. The internal optical fiber array 140 may slide into the holes H1 with leaning onto the inner surfaces of the grooves gr1 since the inner surface of one of the grooves and the inner surface of a corresponding one the holes may form a common surface.

Figure 4:
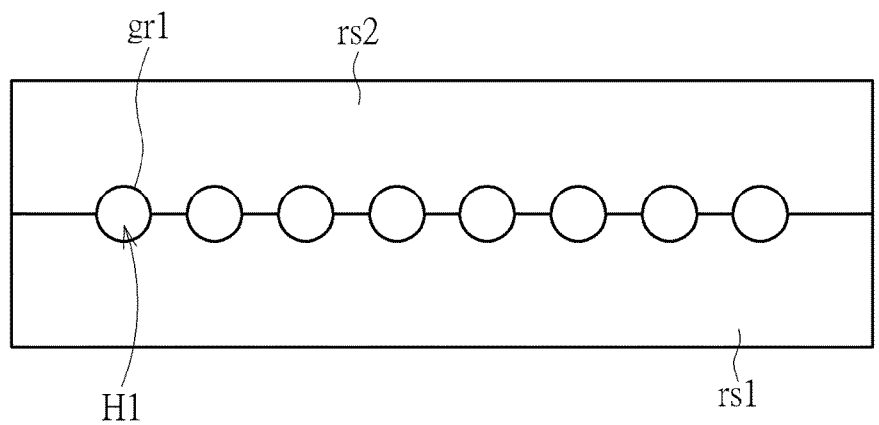
FIG. 4 and FIG. 5 illustrate the holes and the grooves from a top view according to embodiments of the present invention.
Figure 5:
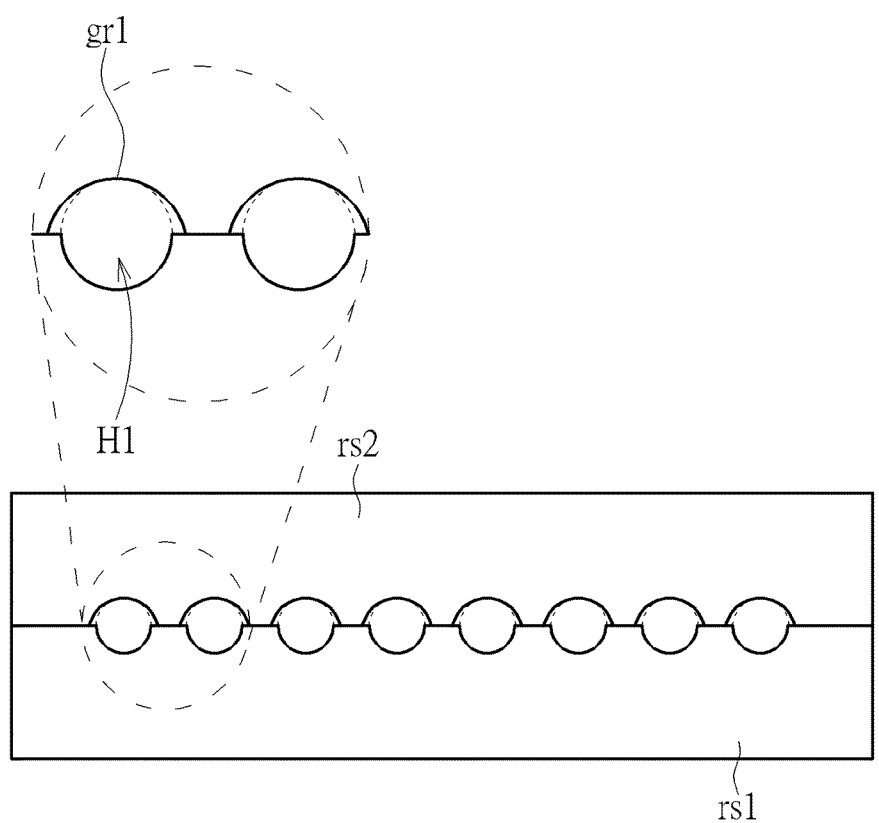

FIG. 4 and FIG. 5 illustrate the holes H1 and the grooves gr1 from a top view according to embodiments of the present invention. As shown in FIGS. 4 and 5, the inner surfaces of the groove gr1 and the hole H1 may be smoothly extended. According to an embodiment of FIG. 4, the inner surface of the groove gr1 may be extended to the inner surface of the hole H1 completely. According to another embodiment of FIG. 5, the inner surface of the groove gr1 may be extended to the inner surface of the hole H1 partially (A diameter of the groove gr1 may be greater than a diameter of the hole H1). However, both of the structures shown in FIGS. 4 and 5 may allow an optical fiber to be placed from a groove to a hole fluently and accurately. According to embodiments of the present invention, the diameter of the hole H1 may be 1.5~0.09 mm (millimeter), +/−0.05 mm, and a pitch between two holes H1 may be 0.01 to 0.3 mm.

Figure 6:
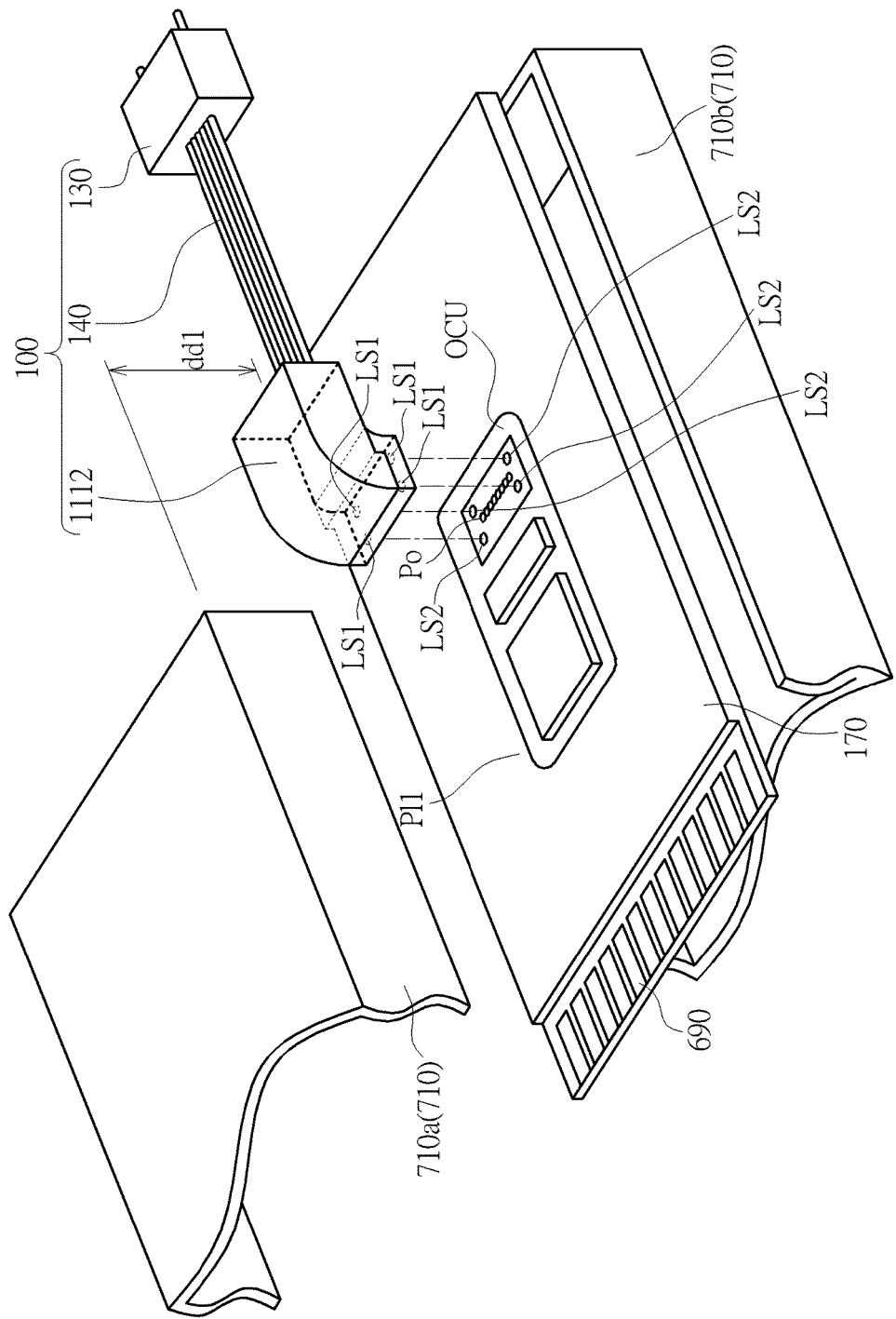
FIG. 6 illustrates the alignment between the coupler of optical fiber strip and the optical-electrical conversion unit according to an embodiment of the present invention.

FIG. 6 illustrates the alignment between the coupler 1112 and the optical-electrical conversion unit OCU according to an embodiment of the present invention. The coupler 1112 may be assembled on the optical-electrical conversion unit OCU for the internal optical fiber 140 to be optically coupled to the optical-electrical conversion unit OCU. As shown in FIG. 6, the stair-shaped base element 110 may further include at least one locating structure LS1 used to being aligned with a corresponding structure LS2 of the optical-electrical conversion unit OCU when assembling the coupler on the optical-electrical conversion unit OCU. According to an embodiment, the optical-electrical conversion unit OCU may have a functional port for optically coupling to the internal optical fiber 140, and the connection may fail if the coupler 1112 fails to be aligned with the optical-electrical conversion unit OCU correctly. The structure LS2 may be generated by means of photoresist etching. According to an embodiment of the present invention, the structure LS2 may be of an L-shape for easier alignment. By aligning the locating structure LS1 and the structure LS2, the yield rate of assembling the coupler 1112 and the optical-electrical conversion unit OCU may be improved. The described locating structures LS1 and LS2 may have a protruding structure or a recessing structure according to embodiments of the present invention. As shown in FIG. 6, the optical-electrical conversion unit OCU and other components may be mounted on a substrate 170 by solder such as tin or tin alloy such as surface-mount technology. The substrate 170 may be a printed circuit board (PCB) or ceramic board according to an embodiment of the present invention. According to an embodiment of the present invention, protection glue (e.g. light-curing adhesive) may be filled in the pool structure pl1 to cover the plurality of bonding wires W, and used to increase stability of bonding wires connecting the optical-electrical conversion unit OCU and a inductive path of the substrate 170. Solder (not shown in FIG. 6) may be placed between the optical-electrical conversion unit OCU and the substrate 170 and used to fix the optical-electrical conversion unit OCU on the substrate 170 stably.

Figure 7:
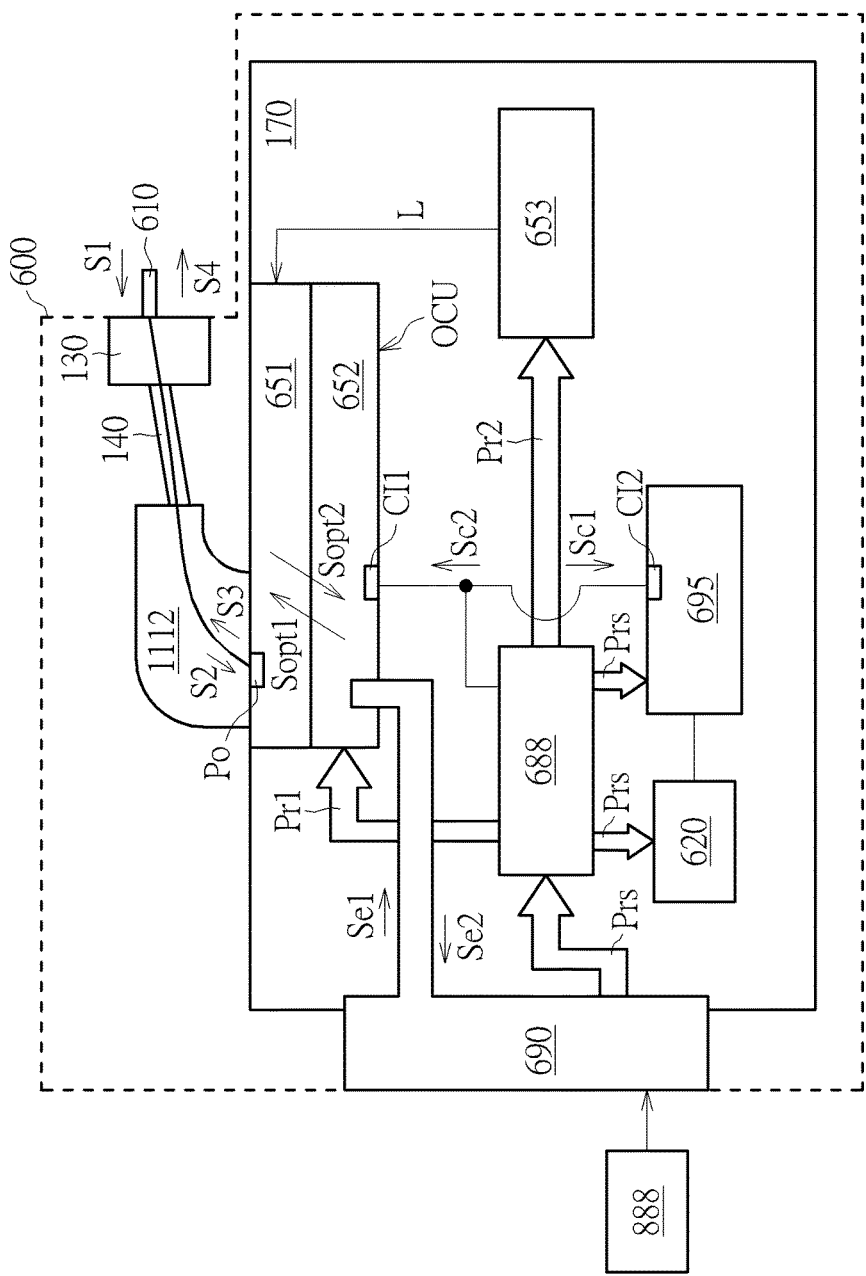
FIG. 7 illustrates a block diagram of an active optical module coupled to an external optical fiber array according to an embodiment of the present invention.

FIG. 7 illustrates a block diagram of an active optical module 600 coupled to an external optical fiber array 610 according to an embodiment of the present invention. The active optical module 600 may include the internal optical fiber 140, the optical fiber coupler 1112, the optical-electrical conversion unit OCU and the adapter 130. The optical-electrical conversion unit OCU may have an optical port Po to be optically coupled to the internal optical fiber 140 when the coupler 1112 is assembled to the optical-electrical conversion unit OCU. According to an embodiment, the optical ports Po may be arranged as an array corresponding to an array of the arrangement of the holes H1 (of the coupler 1112) and the internal optical fiber 140 for high alignment accuracy of optical coupling.

According to an embodiment of the present invention, the optical-electrical conversion unit OCU may include a first control interface CI1 used to send a first control signal Sc1 according to status of the optical-electrical conversion unit OCU, and receive a second control signal Sc2. As shown in FIG. 7, the active optical module 600 may further include a controller unit 695 and a memory unit 620. The controller unit 695 may include a second control interface CI2 coupled to the first control interface CI1, and used to receive the first control signal Sc1, perform an automatic control operation, generate the second control signal Sc2 and send the second control signal Sc2 so as to control the optical-electrical conversion unit OCU. The memory unit 620 may be coupled to the controller unit 695 and used to store a temporary data and a control program of the controller unit 695. According to some embodiments of the present invention, the control unit 695 may be a microcontroller unit (MCU), a central processing unit (CPU), SOC (System on a chip) or a unit performing control and calculation. The memory 620 may be a flash memory, a dynamic random access memory, a non-volatile memory or other compatible kinds of memory.

According to an embodiment of the present invention, the optical-electrical conversion unit OC may include a photonic unit 651, an electrical unit 652 and at least one light source 653. The optical port Po may be located at top surface of the photonic unit 651. The photonic unit 651 may be coupled to a first end of the internal optical fiber 140, and used to process at least one optical signal, for example, receive the second optical signal S1 (as shown in FIG. 1) from the internal optical fiber 140, receive a first operation signal Sopt1 from the electrical unit 652, transmit the third optical signal S3 according to the first operation signal Sopt1 and a first electrical signal Se1 by using at least one light L, and transmit a second operation signal Sopt2 to the electrical unit 652 according to the second optical signal Sopt2. The electrical unit 652 may be coupled to the photonic unit 651, and used to receive the second operation signal Sopt2 from the photonic unit 651, receive the first electrical signal Se1, transmit a second electrical signal Se2 according to the second operation signal Sopt2 and the second optical signal S2, and transmit the first operation signal Sopt1 according to the first electrical signal Se1 to the photonic unit 651. The light source 653 may be coupled to the photonic unit 651, and used to generate the light L and provide the light L to the photonic unit 651 so as to transmit the third optical signal S3. According to embodiments of the present invention, the photonic unit 651 may be a silicon die; the electrical unit 652 may be a die of III-V semiconductor; and the light source 653 may be a LED (Light-emitting diode) or a laser source such as a laser diode or another sort of laser generator having a laser medium (e.g. a P-N junction) that may provide laser as the light L. The photonic unit 651 and the electrical unit 652 may be integrated into one chip (e.g. an SoC or SiP) according to the related process and application.

Figure 8:
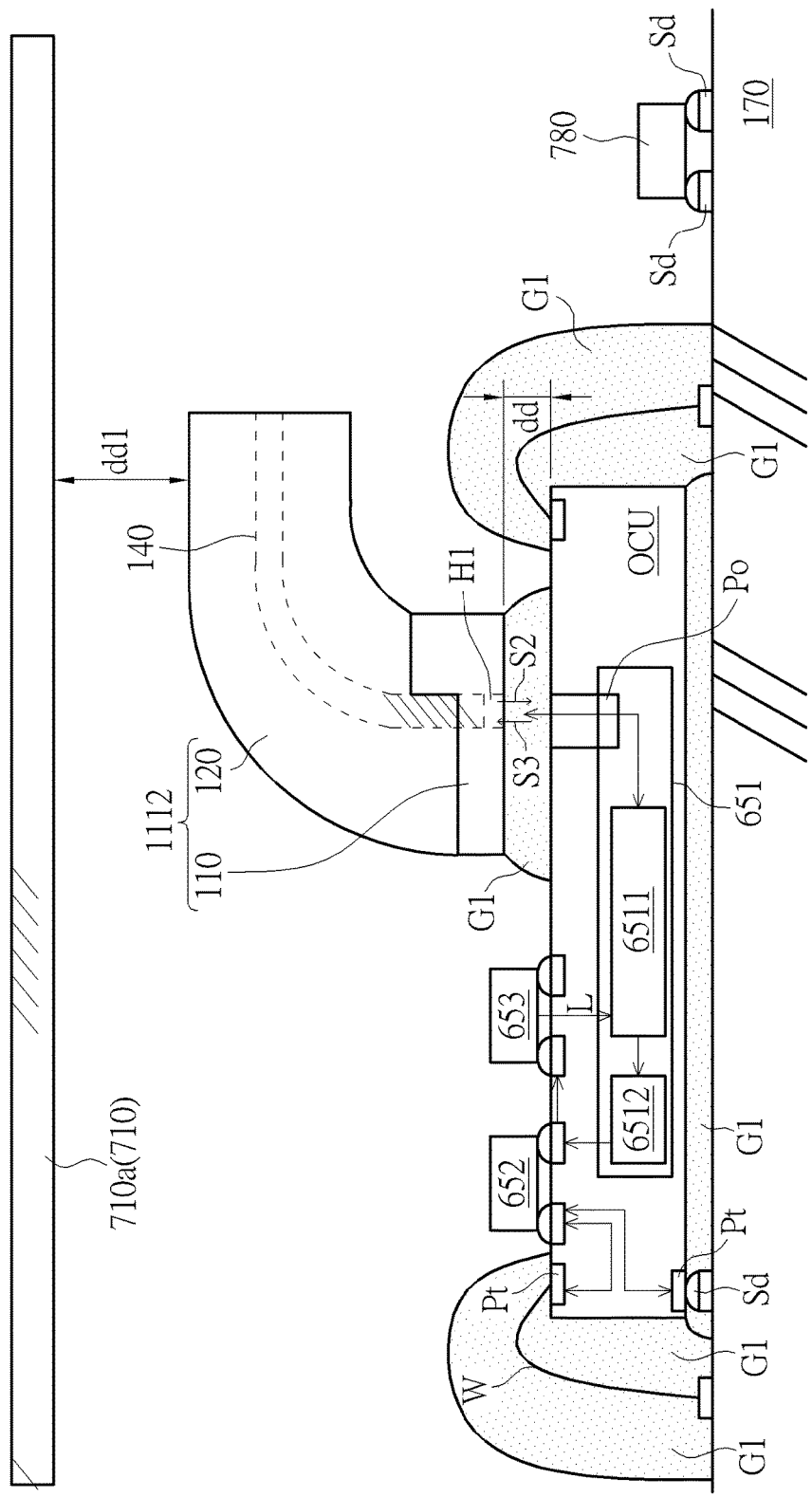
FIG. 8 illustrates a sectional view of the assembly of the coupler of optical fiber strip and the optical-electrical conversion unit according to an embodiment of the present.

FIG. 8 illustrates a sectional view of the assembly of the coupler 1112 and the optical-electrical conversion unit OCU according to an embodiment of the present. In FIG. 8, some details have been omitted, and FIG. 8 may merely be a simplified figure used for explaining the structure rather than a photographic sectional view. As shown in FIG. 8, the photonic unit 651 may have an optical processing unit 6511 and a photo-detector 6512. The optical processing unit 6511 may be coupled to the optical port Po and used to perform light modulation, condensing, light splitting, light guiding, collimating, filtering and/or light coupling by processing the second optical signal S2 and the third optical signal S3. The photo-detector 6512 may be coupled to the optical processing unit 651 and the electrical unit 652 and used to receive the first operational signal Sopt1 and transmit the second operational signal Sopt2.

According to an embodiment of the present invention, the optical-electrical conversion unit OCU may have a set of internal ports and a plurality of function ports and a set of function ports. As shown in FIGS. 7-8, the active optical module 600 may further include the substrate 170, a plurality of bonding wires W, and an electrical interface 690. The internal port of the optical-electrical conversion unit OCU may be coupled to the electrical interface 690, and the function port of the optical-electrical conversion unit OCU may be coupled to a conductive path of the substrate 170. The substrate 170 may have a plurality of conductive paths planned by design for connecting electrical components assembled on the substrate 170. Each bonding wire W may be bonded from a corresponding function port or an internal port to the conductive paths correspondingly. The electrical interface 690 may be a plurality of contacts (a.k.a. gold finger), connector or an interface on edge of the substrate 170 for connecting the active optical module 600 and an external network device (e.g. a switch, host, server, workstation, a router or an end device which is compatible with the active optical transceiver module). The electrical interface 690 may be coupled to the set of internal ports via a corresponding set of the conductive paths, and used to interact with the external network device, transmit the first electrical signal Se1 corresponding to the third optical signal S3 to the optical-electrical conversion unit OCU, and receive the second electrical signal Se2 corresponding to the second optical signal S2. According to an embodiment of the present invention, the optical-electrical conversion unit OCU and the electrical interface 690 may both be installed on the substrate 170 as shown in FIG. 8. As shown in FIG. 8, the optical-electrical conversion unit OCU may be soldered onto the substrate 170 via solder Sd such as Tin or Tin alloy on pad to be fixed and coupled to the corresponding conductive paths. Between the optical-electrical conversion unit OCU and the substrate 170, glue G1 may be used to fill the interspace. The glue G1 may be light-curing adhesive such as UV (ultraviolet) hardening glue for improving the stability of the structure and the reliability of the optical fiber coupler strip. The ports Pt of the optical-electrical conversion unit OCU may include transmitting (TX) ports, receiving (RX) ports, Input/Output (I/O) ports and control ports. When the optical-electrical conversion unit OCU is manufactured as a die or a chip, the ports Pt may be pads (of an unpackaged die) or pins (of a packaged chip). The electrical component 780 in FIG. 8 may stand for a MCU, a power switch, a (DC-DC) regulator, a memory, a passive component (e.g. a resistor, a capacitor, a crystal, oscillator or a inductor) or a signal filter, and the electrical component 780 may show how related electrical components is assembled on the substrate 170 via the solder Sd to be electrically connected to each other. When the coupler 1112 is assembled to the optical-electrical conversion unit OCU, there may be an interspace of a distance dd. The distance dd may be 20±5 um (micrometer) for example. For fixing the coupler 1112, the glue G1 (e.g. UV glue, epoxy glue or fixing glue of other suitable materials) may be dispensed in and around the interspace.

According to an embodiment of the present invention, the active optical module 600 may further have a housing case unit 710(710a, 710b). The housing case unit 710 may include latch and form a housing space inside, and be used to encase and protect the internal optical fiber array 140, the optical fiber coupler 1112 and the optical-electrical conversion unit OCU in the housing space. The minimum distance dd1 from the cover element 120 to an internal top side of the housing case unit 710 may be equal to 2~7.1 millimeter or greater than 2 millimeter for passing a reliability test (e.g. shock or vibration test). The housing case unit 710 may be made of metal and/or plastic materials. The predetermined distance may be designed according to specification and testing result.

Figure 9:
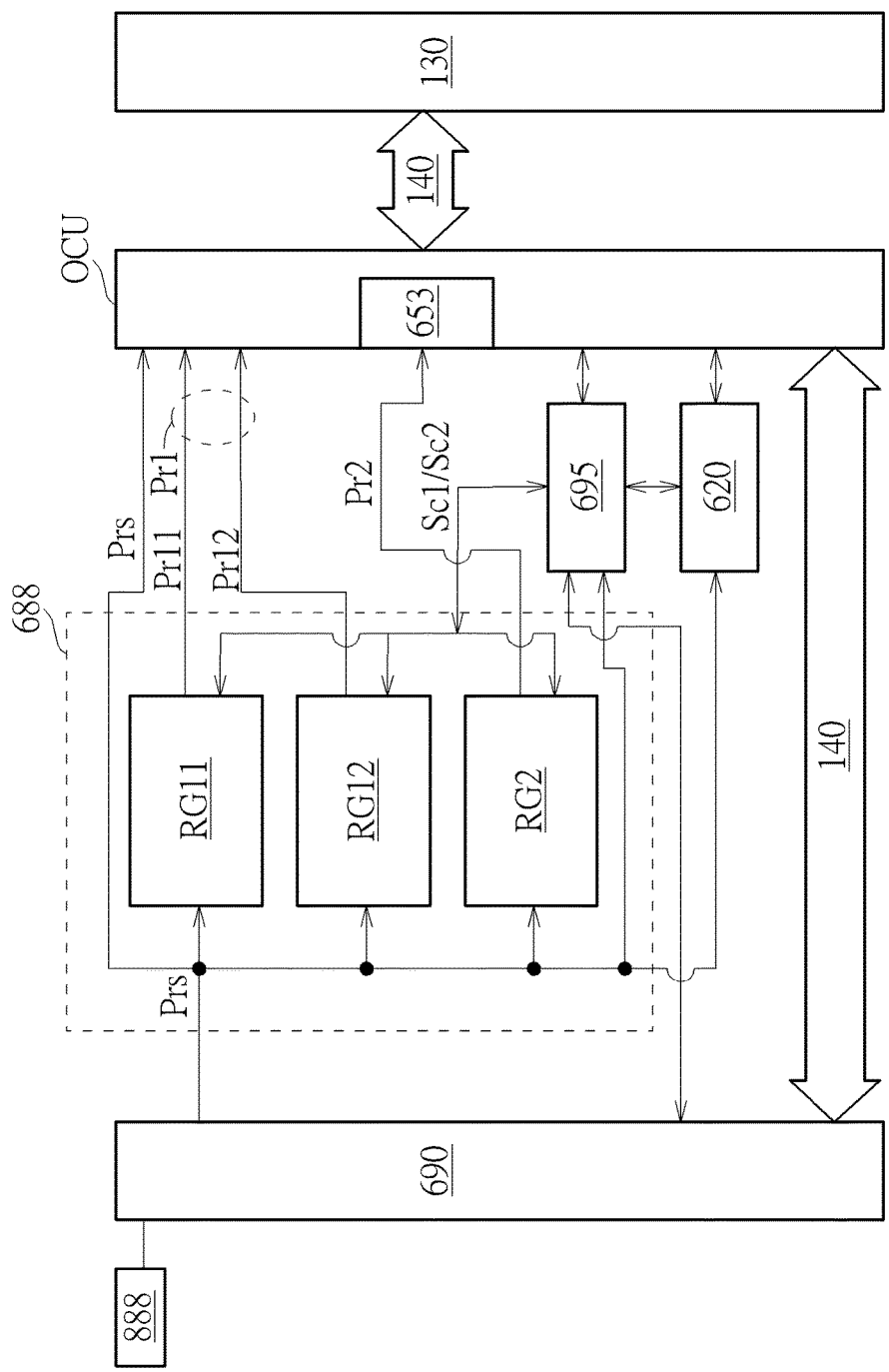
FIGS. 9-10 illustrate block diagrams related to plans of power supply according to embodiments of the present invention.
Figure 10:
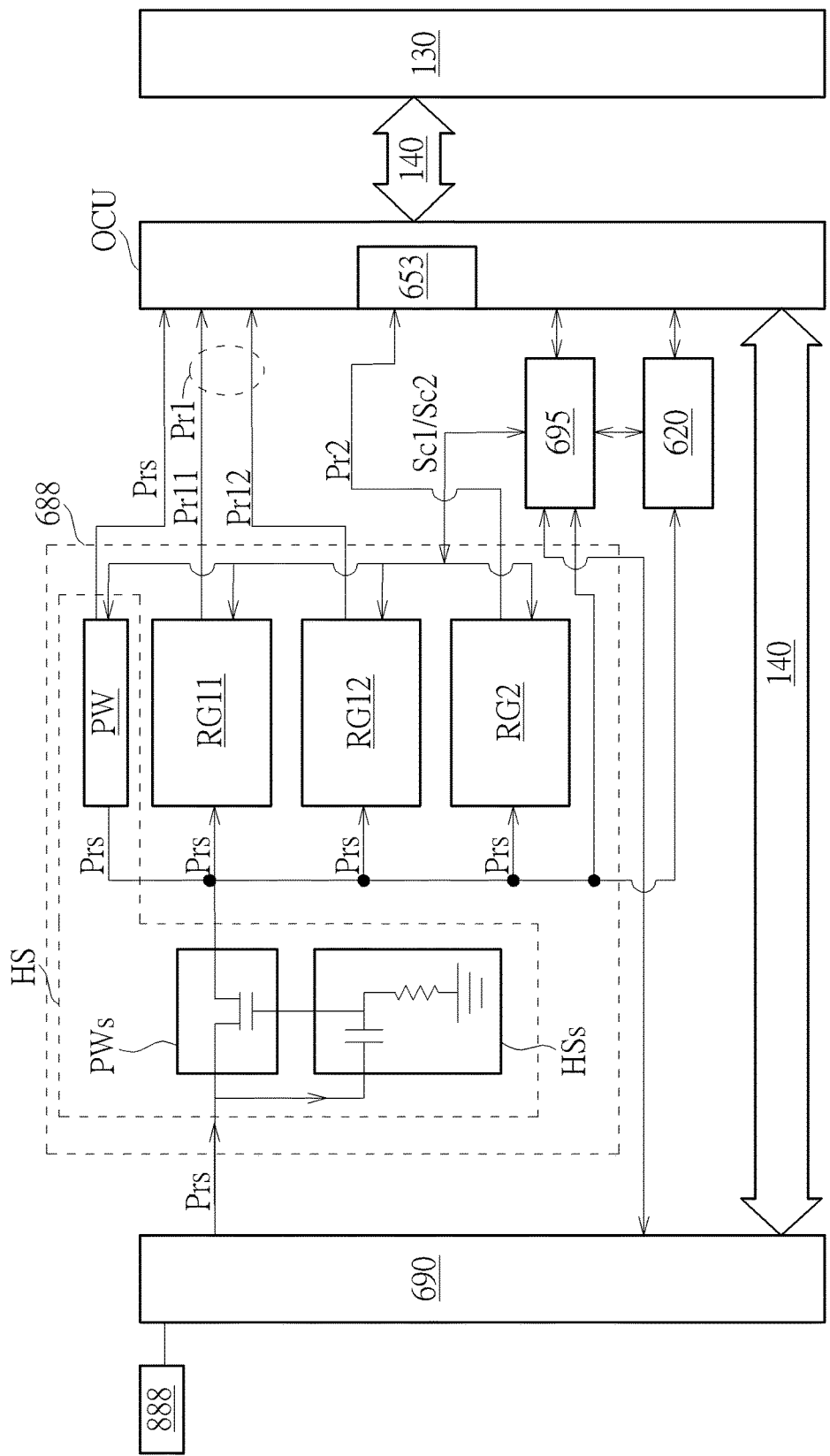

Regarding FIG. 7, according to an embodiment of the present invention, the active optical module 600 may further have a power unit 688 being electrically coupled to the controller unit 695, the memory unit 620, the electrical unit 652 of the optical-electrical conversion unit OCU, the light source 653 of the optical-electrical conversion unit OCU and the light source 653, and used to convert a source power Prs into an operation power Pr1 and another operation power Pr2 to change power level such as Voltage level or Current (Amp) level for providing electrical energy to the controller unit 695, the memory unit 620, the optical-electrical conversion unit OCU and the light source 653. The power unit 688 may be a regulator, a power supplier or another power related component. FIGS. 9-10 illustrate block diagrams related to plans of power supply according to embodiments of the present invention.

FIG. 9 and FIG. 10 may merely be examples rather than limiting the scope of the present invention. Regarding FIG. 9, the power unit 688 may include regulator units RG11, RG12 and RG2. The regulator units RG11 and RG12 may be coupled to the electrical unit 652 of the optical-electrical unit OCU and used receive the source power Prs (e.g. 3.3 volt) and provide a part Pr11 (e.g. 1.0 volt) of the operation power Pr1 and another part Pr12 (e.g. 1.8 volt) of the operation power Pr1. The regulator unit RG2 may be coupled to the light source 653 of the optical-electrical unit OCU and used to receive the source power Prs and provide the operation power Pr2 (e.g. 1.0 to 2.5 volt) to the light source 653. In the example of FIG. 9, the control unit 695 and the memory 620 may be supplied with the source power Prs (e.g. 3.3 volt). The power unit 688 may receive the source power Prs from an external power source 888 (e.g. a power supply device or a power converter) or the external network device via the electrical interface 690 or other power port of the active optical module 600.

Regarding FIG. 10, according to another embodiment of the present invention, when compared with FIG. 9, the power unit may further include a hot-swap unit HS. The hot-swap unit HS may include a source power switch unit PWs, a power switch unit PW and a hot-swap sensing unit HSs. The power switch unit PW may be coupled to the optical-electrical conversion unit OCU and used to receive the source power Prs and control whether the source power Prs is provided to the optical-electrical conversion unit OCU. The source power switch unit PWs may be coupled to the regulator units RG11-RG12 and the power switch unit PW, and used to receive the source power Prs and be controlled whether to send the source power Prs to the regulator units RG11-RG12 and the power switch unit PW. The hot-swap sensing unit HSs may be coupled to the source power switch unit PWs and used to sense a hot-swap operation so as to control the source power switch unit PWs. The hot-swap sensing unit HSs may be used to determine whether the active optical module 600 is of a swap status. The hot-swap sensing unit HSs or controller unit 695 may controls the at least one power switch unit (e.g. the power switch unit PW), the regulator units RG11-RG12 to bypass electrical energy of the source power Prs to the regulator units RG11-RG12 and RG2, the optical-electrical conversion unit OCU or the light source 653 with delay when the active optical module 600 is of the swap status.

For example, when the hot-swap operation (e.g. the electrical interface 690 being plugged into the external power source 888 or the external network device) occurs, the hot-swap sensing unit HSs may send a signal to turn on the source power switch unit PWs. According to the embodiment of FIG. 8, the hot-swap sensing unit HSs may include a capacitor and a resistor, and the source power switch unit PWs may include a transistor (e.g. p-type MOSFET or n-type MOSFET). However, the hot-swap sensing unit HSs and the source power switch unit PWs that are implemented with other structure may be allowed according to embodiments of the present invention. In FIG. 7 and FIG. 8, the regulator units RG11, RG12 and RG2 may be DC-DC regulators according to embodiments of the present invention.

Figure 11:
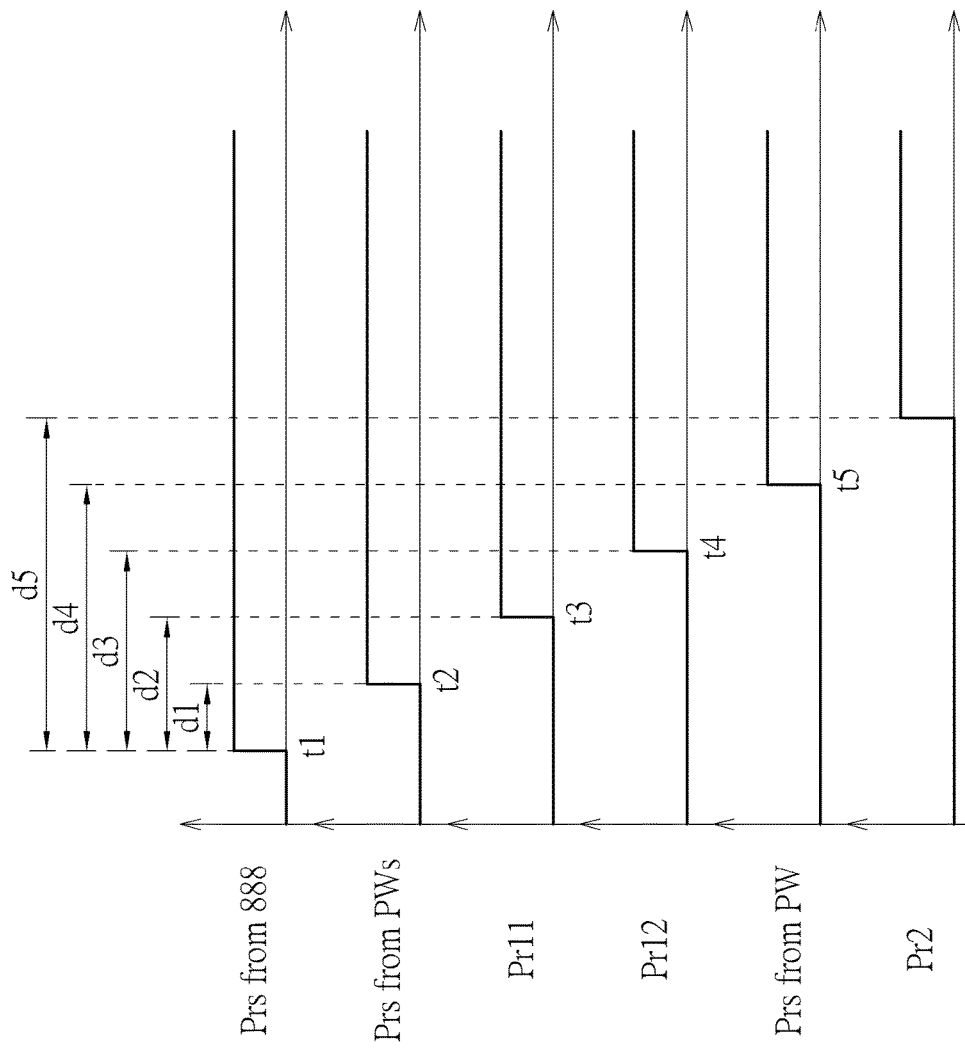
FIG. 11 illustrates a power-on sequence diagram according to the embodiment of FIG. 10.

FIG. 11 illustrates a power-on sequence diagram according to the embodiment of FIG. 10. For example, when the hot-swap operation occurs, the source power Prs may be provided from the external power source 888 or the external network device to the source power switch unit PWs at a time point t1. The source power Prs from the power switch unit PWs may be bypassed from the source power switch unit PWs to the controller unit 695, the memory unit 620, the power switch unit PW and the regulators units RG11, RG12 and RG2 at a time point t2. The part Pr11 of the operation power Pr1 may be provided from the regulator unit RG11 to the optical-electrical conversion unit OCU at a time point t3. The part Pr12 of the operation power Pr1 may be provided from the regulator unit RG12 to the optical-electrical conversion unit OCU at a time point t4. The source power Prs may be provided from the power switch unit PW to the source power switch unit PWs at a time point t5. The operation power Pr2 may be provided from the regulator unit RG2 to the light source 653 at a time point t6. From the time points t1 to t6, there may be time intervals d1 to d5 as shown in FIG. 9. For example, the controller unit 695 can control operation of the power switch unit PW and the regulators units RG11, RG12 and RG2 to change each of the time intervals d1 to d5 such as identical difference time period (e.g. 1 microsecond (d2−d1=d3−d2=d4−d3=d5−d4)) so as to sequentially startup the controller unit 695, the memory unit 620, the electrical unit 652 of the optical-electrical conversion unit OCU, the light source 653 of the optical-electrical conversion unit OCU.

Figure 12:
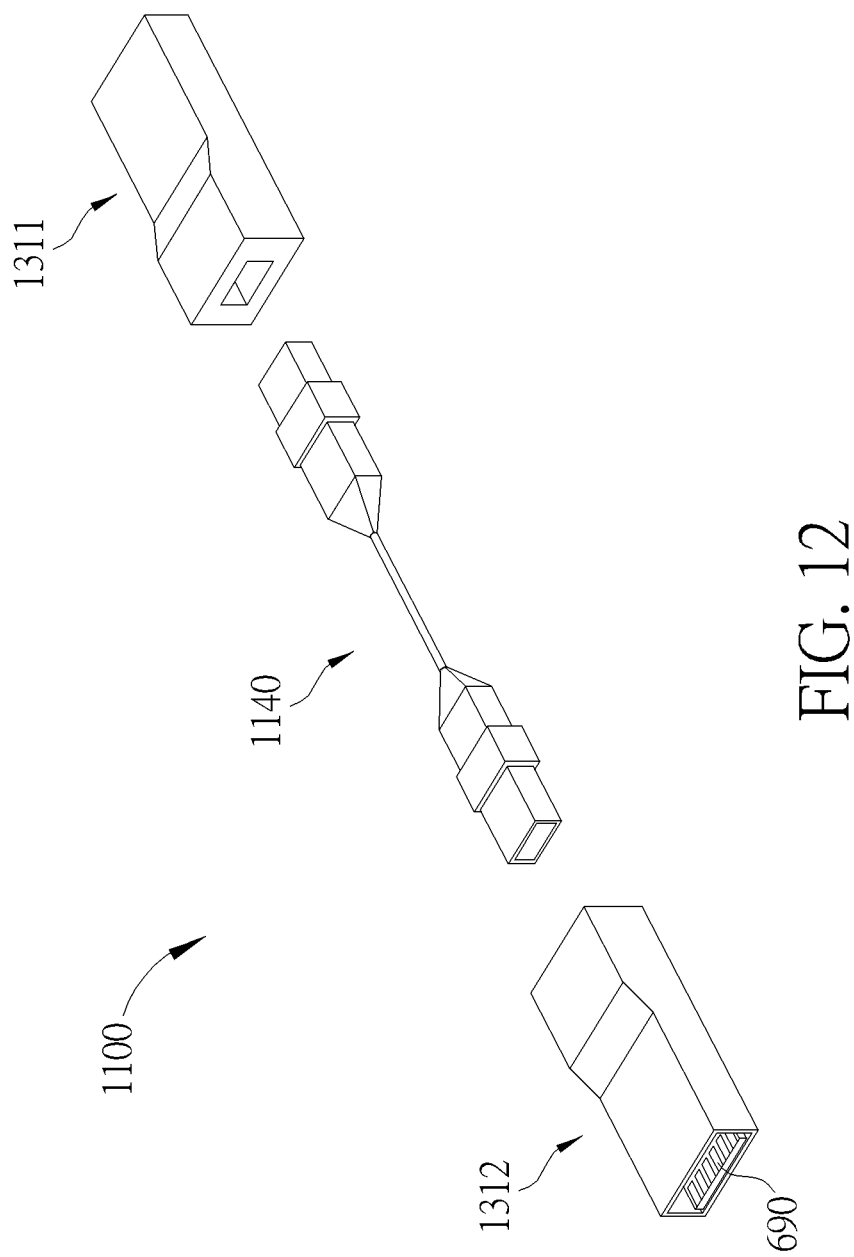
FIG. 12 illustrates an active optical cable according to an embodiment of the present invention.
Figure 13:
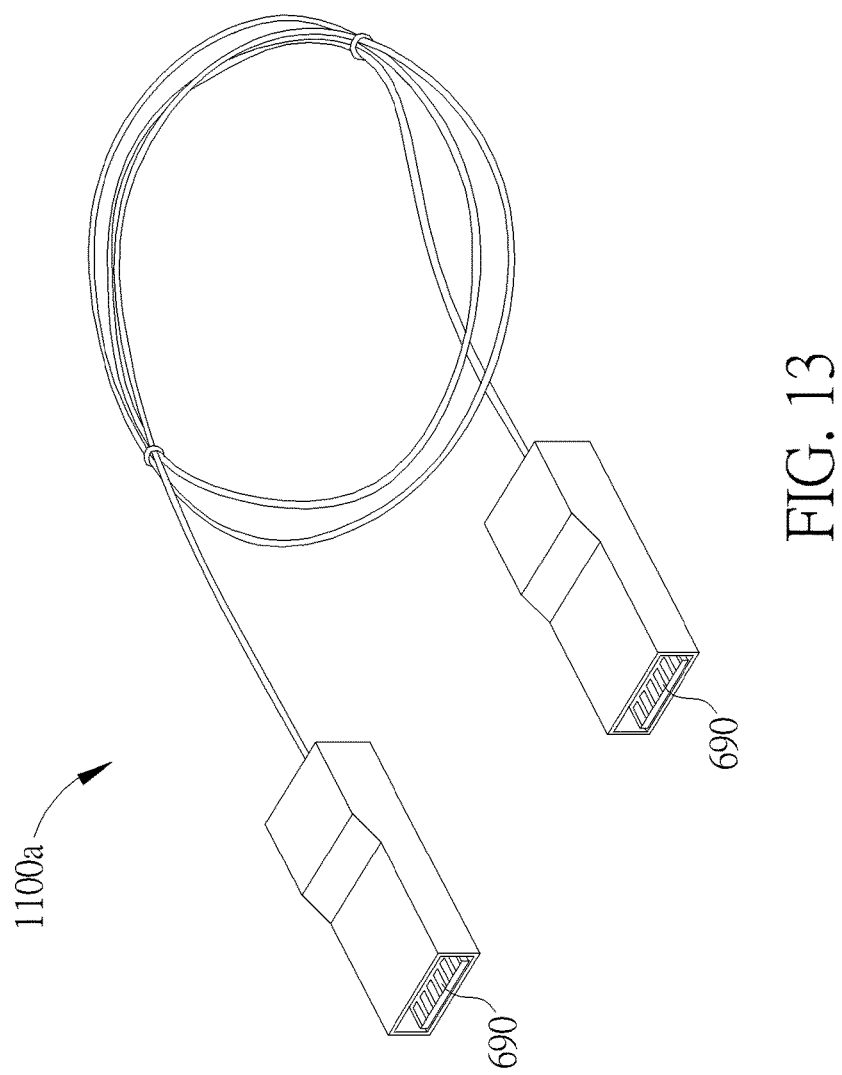
FIG. 13 illustrates an active optical cable according to an embodiment of the present invention.

FIG. 12 illustrates an active optical cable 1100 according to an embodiment of the present invention. The active optical cable 1100 may include an external fiber array 1140, a first active optical module 1311, and a second active optical module 1312 according to an embodiment of the present invention. Each of the first and second active optical modules 1311-1312 may be similar with the foresaid 600, so the detail is not described repeatedly. As shown in FIG. 12, the external optical fiber array 1140 may be pluggable type and may have a first end and a second end to be plugged into optical interface of the active optical modules 1311-1312 such as adapter, respectively, and be used to transfer at least one optical signal such as the optical signals between the first and second active optical modules 1311-1312. Two network devices may be communicated with one another by connecting the first active optical module 1311 with one network device and connecting the second active optical module 1312 with another network device according to an embodiment of the present invention. FIG. 13 illustrates an active optical cable 1100a according to an embodiment of the invention. Unlike the active optical cable 1100, the active optical cable 1100a may not include adapters. In FIG. 13, each of a first end and a second end of an optical fiber array of an optical fiber strip may be extended directly to the holes of a coupler of an active optical module to form the active optical cable 1100a. The structure may be similar to the foresaid structures, so it is not described repeatedly.

In summary, by using the optical fiber strip, the active optical module and the active optical cable provided according to embodiments of the present invention, the reliability and assembly accuracy of the optical fiber strip related the active optical module and the active optical cable may be well improved. Optical fibers may therefore be prevented from being broken when being coupled to a related optical element of circuit, an adapter or other optical fibers. Since a curvature of an optical fiber array may be kept accurately, the insertion loss may be controlled to be lower than 10% For example, the insertion loss may be merely 1%-10% according to an embodiment of the present invention. The effect of preventing insertion loss and unwanted over curvature of the optical fiber on a multi-mode operation may be more obvious comparing with single-mode operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. An optical fiber strip comprising:
    a stair-shaped base element having:
        a first receiving surface on a first stair of the stair-shaped base element;
        a second receiving surface on a second stair of the stair-shaped base element;
        a plurality of holes integrally formed and extending from the first receiving surface to a bottom surface of the stair-shaped base element; and
        a first bearing surface connecting the first receiving surface and the second receiving surface;
    a cover element comprising:
        a first end;
        a second end;
        a first curved part having a first covering surface forming a first stair of the cover element at the first end;
        a second curved part having a second covering surface forming a second stair of the cover element at the first end;

a second bearing surface connecting the first covering surface and the second covering surface of the cover element; and an internal curved space between the first curved part and second curved part extending from the second end to the second bearing surface;

an adapter configured to be selectively connected to an external optical fiber array; and an internal optical fiber array connected to the adapter and the plurality of holes passing through the internal curved space to be selectively and optically coupled to an optical-electrical conversion unit on the bottom surface of the stair-shaped base element, and configured to receive or transmit at least one optical signal from the external optical fiber array via the adapter or from the optical-electrical conversion unit via the plurality of holes, wherein a curved portion of the internal optical fiber array is located in the internal curved space for changing direction of the internal optical fiber array;

wherein at least one of the first bearing surface and the second bearing surface has a plurality of grooves forming a plurality of pathways connecting the internal curved space to the plurality of holes when the first receiving surface, the second receiving surface, the first bearing surface of the stair-shaped base element are respectively join to the first covering surface, the second covering surface, and the second bearing surface of the cover element, the internal optical fiber array is extended from the internal curved space and inserted to the plurality of holes, the internal optical fiber array is positioned according to a hole pattern of the plurality of holes in the stair-shaped base element, the internal optical fiber array is curved according to a radius of curvature of the internal curved space in the cover element, and position and a radius of curvature of the internal optical fiber array are determined by the stair-shaped base element and the cover element respectively.

2. The optical fiber strip of claim 1, wherein the stair-shaped base element is formed by using a transparent or translucent material.

3. The optical fiber strip of claim 1, wherein:
the internal curved space forms a lateral opening of the optical fiber strip for the curved portion of the internal optical fiber array to be slid into the internal curved space;
the cover element further comprises a connection part coupled to the first curved part and the second curved part;
the first curved part, the second curved part and the connection part are integrally formed; and
the internal curved space is among the first curved part, the connection part and the second curved part.

4. The optical fiber strip of claim 1, wherein the cover element has a radius of curvature greater than 2.3 millimeter or equal to 2.3~5 millimeter.

5. The optical fiber strip of claim 1, wherein the plurality of grooves are formed on the first bearing surface, and portions of inner surfaces of the plurality of grooves are smoothly extended to portions of inner surfaces of the plurality of holes.

6. The optical fiber strip of claim 1, further comprising glue filled into the internal curved space.

7. The optical fiber strip of claim 1, wherein the stair-shaped base element further comprises a locating structure on the bottom surface of the stair-shaped base element configured to be aligned with a corresponding structure of the optical-electrical conversion unit when assembling the stair-shaped base element on the optical-electrical conversion unit.

8. The optical fiber strip of claim 1, wherein the plurality of holes is parallel to the first bearing surface and extending through the stair-shaped base element.

9. An active optical module comprising:
a substrate comprising a plurality of conductive paths, an electrical interface and a plurality of pads;
a housing case unit forming a housing space inside, and configured to encase an internal optical fiber array, an optical fiber strip and an optical-electrical conversion unit in the housing space;
the optical-electrical conversion unit mounted on the substrate to convert between electrical signals and respective optical signals; and
the optical fiber strip coupled to the optical-electrical conversion unit and the housing case unit to provide an optical interface, and comprising:
a stair-shaped base element mounted on the optical electrical conversion unit and having:
a first receiving surface on a first stair of the stair-shaped base element;
a second receiving surface on a second stair of the stair-shaped base element;
a plurality of holes integrally formed and extending from the first receiving surface to a bottom surface of the stair-shaped base element; and
a first bearing surface connecting the first receiving surface and the second receiving surface;
a cover element comprising:
a first end;
a second end;
a first curved part having a first covering surface forming a first stair of the cover element at the first end;
a second curved part having a second covering surface forming a second stair of the cover element at the first end;
a second bearing surface connecting the first covering surface and the second covering surface of the cover element; and
an internal curved space between the first curved part and second curved part extending from the second end to the second bearing surface;
an adapter configured to be selectively connected to an external optical fiber array; and
an internal optical fiber array connected to the adapter and the plurality of holes passing through the internal curved space to be optically coupled to the optical-electrical conversion unit on the bottom surface of the stair-shaped base element, and configured to receive or transmit at least one optical signal from the external optical fiber array via the adapter or from the optical-electrical conversion unit via the plurality of holes, wherein a curved portion of the internal optical fiber array is located in the internal curved space for changing direction of the internal optical fiber array;
wherein at least one of the first bearing surface and the second bearing surface has a plurality of grooves forming a plurality of pathways connecting the internal curved space to the plurality of holes when the first receiving surface, the second receiving surface, and the first bearing surface of the stair-shaped base element are respectively join to the first covering surface, the second covering surface, the second bearing surface of the cover element, the internal optical fiber array is extended from the internal curved space and inserted to the plurality of holes, the internal optical fiber array is positioned according to a hole pattern of the plurality of holes in the stair-shaped base element, the internal optical fiber array is curved according to a radius of curvature of the internal curved space in the cover element, and position and a radius of curvature of the internal optical fiber array are determined by the stair-shaped base element and the cover element respectively.

10. The active optical module of claim 9, wherein the stair-shaped base element is formed by using a transparent or translucent material.

11. The active optical module of claim 9, wherein:
the internal curved space forms a lateral opening of the optical fiber strip for the curved portion of the internal optical fiber array to be slid into the internal curved space;
the cover element further comprises a connection part coupled to the first curved part and the second curved part;
the first curved part, the second curved part and the connection part are formed integrally; and
the internal curved space is among the first curved part, the connection part and the second curved part.

12. The active optical module of claim 9, wherein the stair-shaped base element further comprises a locating structure on the bottom surface of the stair-shaped base element configured to be aligned with a corresponding structure of the optical-electrical conversion unit when assembling the stair-shaped base element of the optical fiber strip on the optical-electrical conversion unit.

13. The active optical module of claim 9, wherein the optical-electrical conversion unit further comprises:
a photonic unit having optical ports located at top surface of the photonics unit, and being optically coupled to a first end of the internal optical fiber array via the optical ports, and configured to process the at least one optical signal according to at least one operation signal from an electrical unit or at least one electrical signal by using light;
the electrical unit coupled to the photonic unit, and configured to drive the photonic unit according to the at least one electrical signal by the at least one operation signal; and
a light source coupled to the photonic unit, and configure to provide at least one light to the photonic unit so as to transmit the at least one optical signal.

14. The active optical module of claim 13, further comprising:
a controller unit being electrically connected to the optical-electrical conversion unit, and configured to perform an automatic control operation of the optical-electrical conversion unit;
a memory unit being electrically connected to the controller unit and configured to store a temporary data of the controller unit and a control program; and
a power unit being electrically coupled to the optical-electrical conversion unit and the light source, and configured to convert a source power into at least one operation power to change power level for providing electrical energy to the optical-electrical conversion unit and the light source.

15. The active optical module of claim 14, wherein the power unit comprises:

at least one regulator unit being electrically coupled to the optical-electrical conversion unit and the light source configured to convert the source power into the at least one operation power; and
a hot-swap unit comprising at least one power switch unit and a hot-swap sensing unit, wherein the hot-swap sensing unit is configured to determine whether the active optical module is of a swap status so that the hot-swap sensing unit or the controller unit controls the at least one power switch unit, the at least one power switch unit to bypass electrical energy of the source power to the at least one power switch unit, the optical-electrical conversion unit or the light source with delay when the active optical module is of the swap status.

16. The active optical module of claim 9, further comprising:
a plurality of bonding wires configured to be bonded from the optical-electrical conversion unit to the plurality of conductive paths correspondingly;
protection glue to cover the plurality of bonding wires and increase stability of the bonding wires; and
a solder placed between the optical-electrical conversion unit and the substrate and configured to fix the optical-electrical conversion unit on the substrate.

17. The active optical module of claim 9, further comprise light-curing adhesive dispensed between the stair-shaped base element and the optical-electrical conversion unit.

18. The active optical module of claim 9, wherein the plurality of grooves are formed on the first bearing surface, and portions of inner surfaces of the plurality of grooves are smoothly extended to portions of inner surfaces of the plurality of holes.

19. The active optical module of claim 9, further comprising a minimum distance from the cover element of the optical fiber strip to an internal top side of the housing case unit is equal to 2~7.1 millimeter or greater than 2 millimeter.

20. An active optical cable comprising:
an optical fiber array comprising a first end and a second end, and configured to transfer at least one optical signal; and
a pair of active optical modules optically coupled to each other by the optical fiber array, wherein one of the active optical modules comprising:
a substrate comprising a plurality of conductive paths, an electrical interface and a plurality of pads;
a housing case unit forming a housing space inside, and configured to encase one of the first end and the second end of the optical fiber array and an optical-electrical conversion unit in the housing space;
the optical-electrical conversion unit mounted on the substrate to convert between electrical signals and respective optical signals;
a stair-shaped base element mounted on the optical electrical conversion unit and having:
a first receiving surface on a first stair of the stair-shaped base element,
a second receiving surface on a second stair of the stair-shaped base element,
a plurality of holes integrally formed and extending from the first receiving surface to a bottom surface of the stair-shaped base element, and
a first bearing surface connecting the first receiving surface and the second receiving surface; and
a cover element comprising:
a first end;
a second end;

a first curved part having a first covering surface forming a first stair of the cover element at the first end;

a second curved part having a second covering surface forming a second stair of the cover element at the first end;

a second bearing surface connecting the first covering surface and the second covering surface of the cover element; and an internal curved space between the first curved part and second curved part extending from the second end to the second bearing surface;

wherein one of the first end and the second end of the optical fiber array extending from outside of the housing case unit to the plurality of holes passing through the internal curved space to be optically coupled to the optical-electrical conversion unit on the bottom surface of the stair-shaped base element, and configured to receive or transmit at least one optical signal from the optical fiber array or from the optical-electrical conversion unit via the plurality of holes, and a curved portion of the optical fiber array is located in the internal curved space for changing direction of the optical fiber array;

wherein at least one of the first bearing surface and the second bearing surface has a plurality of grooves forming a plurality of pathways connecting the internal curved space to the plurality of holes when the first receiving surface, the second receiving surface, and the first bearing surface of the stair-shaped base element are respectively join to the first covering surface, the second covering surface, and the second bearing surface of the cover element;

where the optical fiber array is extended from the internal curved space and inserted to the plurality of holes, the optical fiber array is positioned according to a hole pattern of the plurality of holes in the stair-shaped base element, the optical fiber array is curved according to a radius of curvature of the internal curved space in the cover element, and position and a radius of curvature of the optical fiber array are determined by the stair-shaped base element and the cover element respectively.

* * * * *